United States Patent [19]

Moore et al.

[11] Patent Number: 5,542,591
[45] Date of Patent: Aug. 6, 1996

[54] SIDE BRACKET FOR NETTING AND PROCESS FOR ASSEMBLING THE NETTING THERETO

[75] Inventors: Donal Moore, Birmingham; Colin D. Pringle, Utica, both of Mich.

[73] Assignee: Tecsyn, Inc., Canada

[21] Appl. No.: 306,643

[22] Filed: Sep. 15, 1994

[51] Int. Cl.⁶ .............................. B60R 7/00; B60R 7/10; B60R 9/00; B60R 11/00
[52] U.S. Cl. .................... 224/545; 224/547; 224/549; 224/550; 224/555; 224/560; 224/561; 224/563; 224/925; 296/50; 296/180.1; 160/388
[58] Field of Search ....................... 224/314, 321, 224/545, 547, 549, 550, 555, 559, 560, 561, 563, 572, 925; 296/24.1, 50, 37.8, 37.16, 180.1; 280/748, 749; 410/118, 129, 141, 145; 180/271; 160/371, 380, 388, 390; 24/115 K, 265 A, 265 R, 300

[56] References Cited

U.S. PATENT DOCUMENTS

| | | | |
|---|---|---|---|
| 1,837,537 | 12/1931 | Emerson . | |
| 2,532,713 | 12/1950 | Gottfried | 160/388 |
| 2,705,461 | 4/1955 | Campbell | 105/369 |
| 2,950,691 | 8/1960 | Huber | 410/118 |
| 2,986,315 | 5/1961 | Zimmerman | 224/42.32 |
| 3,438,673 | 4/1969 | Nelson | 105/369 |
| 3,986,656 | 10/1976 | November | 229/15 |
| 4,189,056 | 2/1980 | Majewski | 211/195 |
| 4,964,771 | 10/1990 | Callihan | 410/118 |
| 4,974,549 | 12/1990 | Gordon | 24/115 K |
| 5,012,963 | 5/1991 | Rosenbaum | 224/42.46 |
| 5,026,231 | 6/1991 | Moore | 410/118 |
| 5,040,711 | 8/1991 | Neiderhauser et al. | 224/42.46 |
| 5,040,934 | 8/1991 | Ross | 410/97 |
| 5,058,786 | 10/1991 | Politi | 224/42.32 |
| 5,090,856 | 2/1992 | Moore | 410/118 |
| 5,118,019 | 6/1992 | Harrison | 224/42.46 |
| 5,121,958 | 6/1992 | Goeden et al. | 296/37.1 |
| 5,186,587 | 2/1993 | Moore | 410/118 |
| 5,340,004 | 8/1994 | Moore | 224/42.46 R |
| 5,427,486 | 6/1995 | Green | 296/24.1 |

FOREIGN PATENT DOCUMENTS 223680  6/1985  Germany .

OTHER PUBLICATIONS

Merkur XR4Ti, 1985 Owners Guide, Jun. 1984.

Primary Examiner—Henry J. Recla
Assistant Examiner—Timothy L. Maust
Attorney, Agent, or Firm—Young & Basile, P.C.

[57] ABSTRACT

A side bracket for netting has a top, a bottom, two opposed sides, a plurality of net loops extending along the netting top, bottom and sides, and an elastic cord threaded through at least one of the top and bottom net loops. The bracket comprises a base having two opposed ends and located adjacent at least one of the netting sides. A net loop receiving member is disposed between the two ends. A housing is provided for the elastic cord. The bracket further comprises a mechanism for attaching the cord housing to the base, and a mechanism for attaching the netting to a desired surface. A process for assembling the netting to the bracket comprises the step of placing a row of side net loops over a corresponding number of net loop receiving members. The net loop receiving members are disposed on a base of the bracket, and each of the net loop receiving members has an outwardly projecting net loop retaining wall having an upper surface, a lower surface, and two opposed ends adjacent the retaining wall lower surface. A loop recess is defined at each of the retaining wall ends, and a mechanism is provided for guiding opposed ends of the net loop into an adjacent loop recess. An elastic cord is threaded through at least one of the top and bottom net loops, and, on at least one side, the cord is attached to a cord housing.

32 Claims, 4 Drawing Sheets

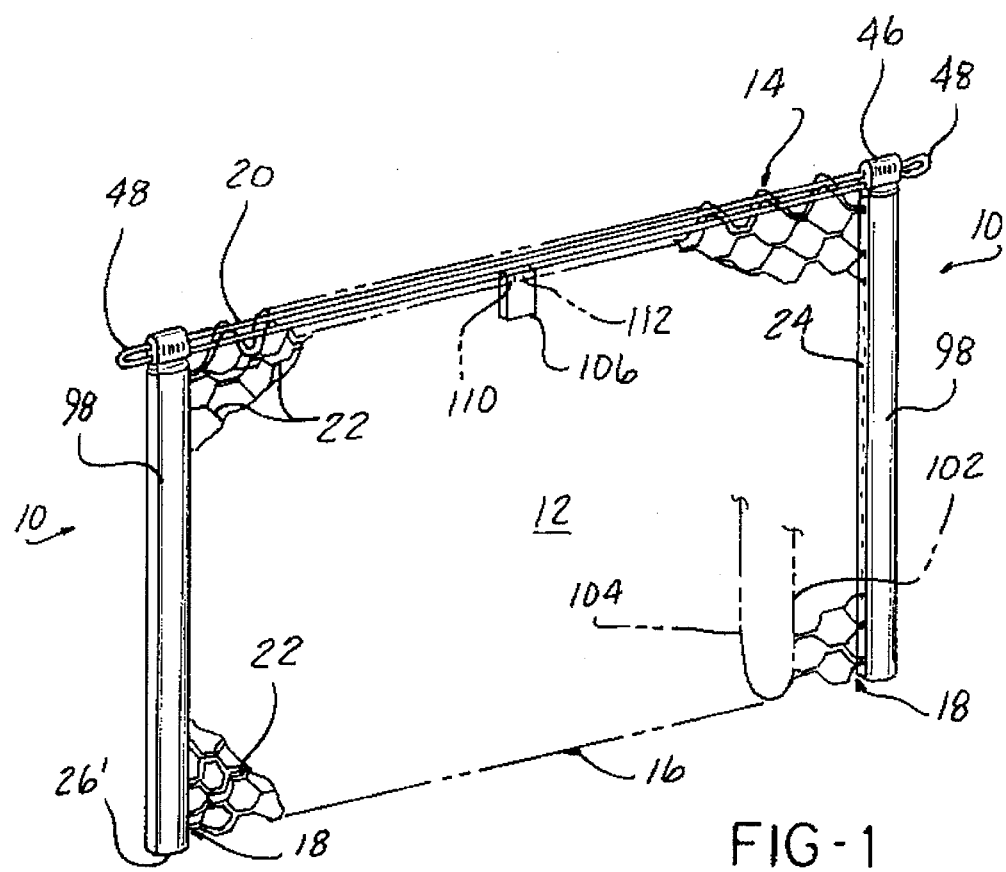
FIG-1
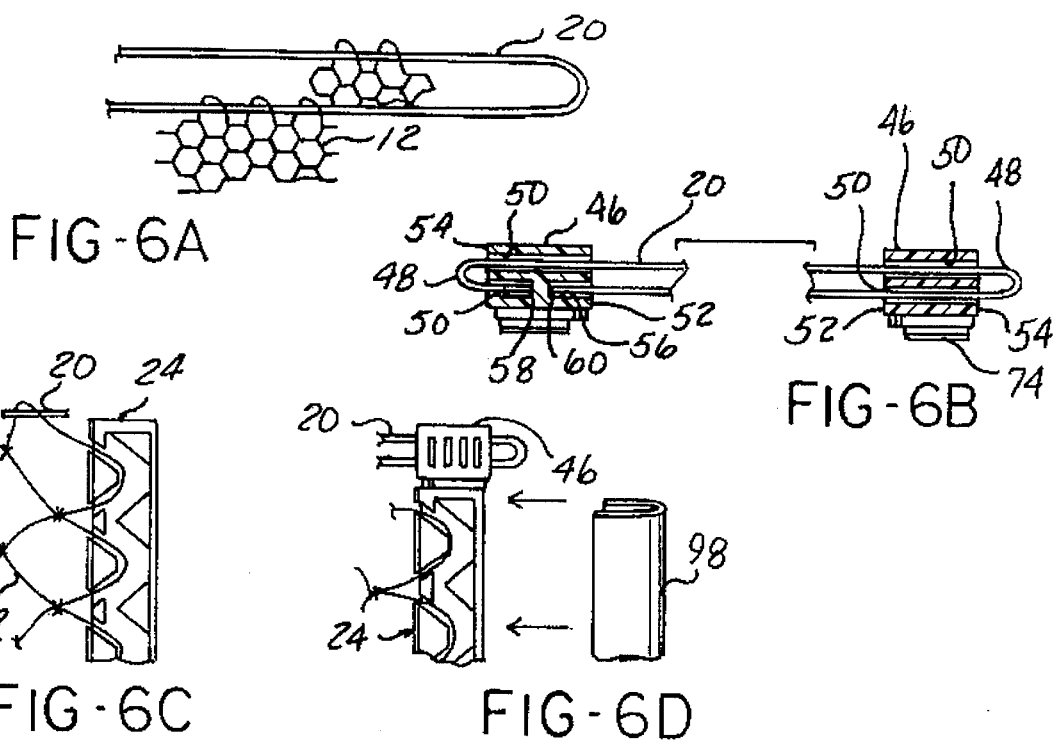
FIG-6A  FIG-6B
FIG-6C  FIG-6D

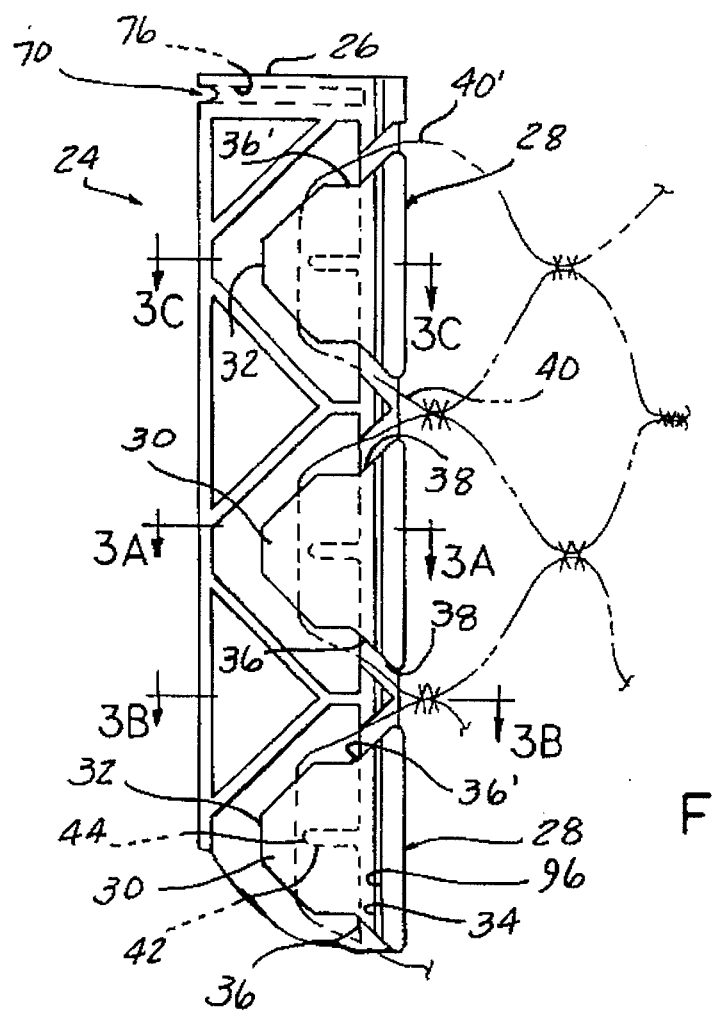
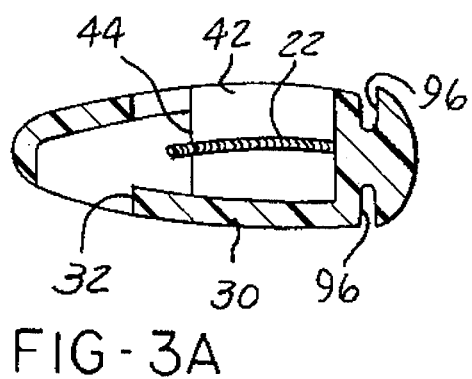
FIG-3A
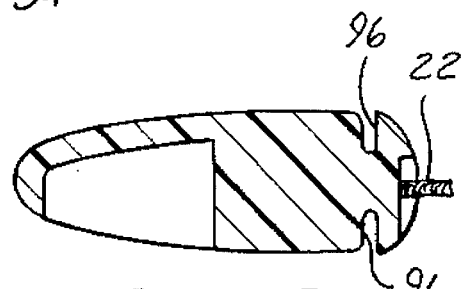
FIG-3B
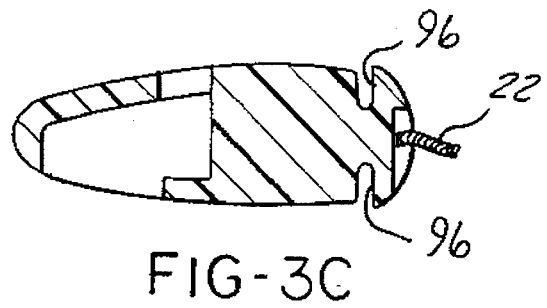
FIG-3C
FIG-2

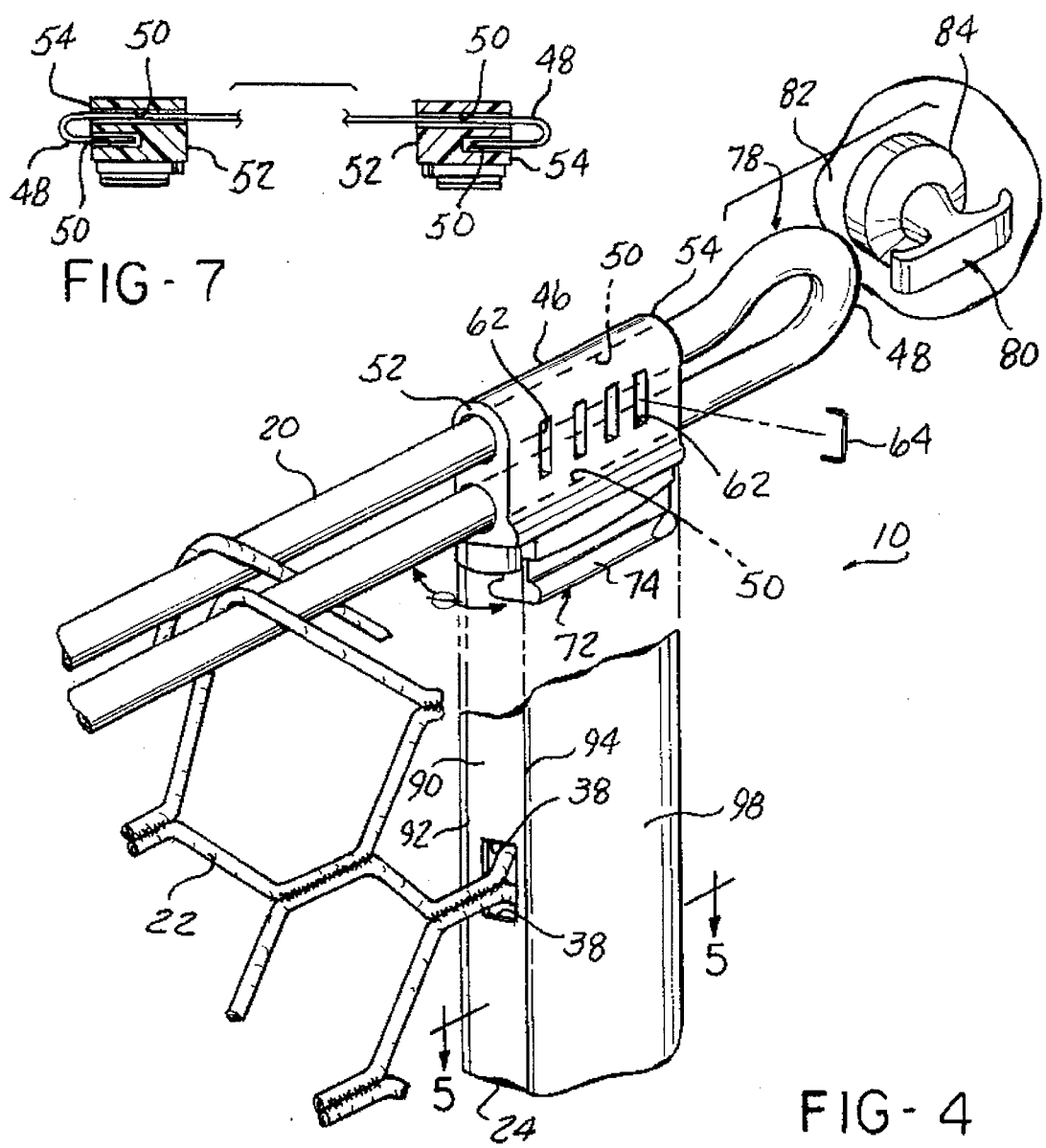
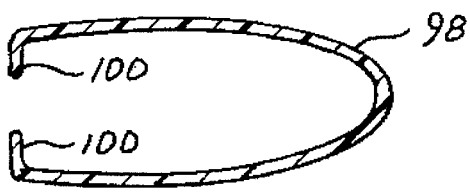

5,542,591

SIDE BRACKET FOR NETTING AND PROCESS FOR ASSEMBLING THE NETTING THERETO

BACKGROUND OF THE INVENTION

The present invention relates generally to brackets, and more particularly to a molded side bracket for netting.

Consumers continually seek more efficient, convenient and versatile ways to transport or store contents to be stowed in a motor vehicle such as a van, automobile, four wheel drive off-the-road vehicle, closet, or the like. Conventional means of stowage transport have consisted mainly in trunk space, beds of pick-up trucks, or the area behind the rear seats in a van. In closets and the like, conventional means of stowage have been shelves, "closet organizers", or simply the closet floor. These means have served their purpose satisfactorily, however, several drawbacks exist.

One disadvantage of the examples cited above is that stowage is freely movable within the stowage compartment, and can be damaged in the event of a sudden stop, or jostling when looking for an item or adding another item to the stowage. Further, conventional stowage transporting/storage means generally have only one large compartment, and it is difficult to transport a mixture of heavy items with more delicate or fragile items. Still further, closet shelves can be very difficult to reach, and "closet organizers" can be quite bulky and space consuming.

One attempt at solving these problems is set forth in U.S. Pat. No. 5,340,004, issued Aug. 23, 1994. The storage net described therein does solve the aforementioned problems. However, one drawback may exist in that the sides of the netting therein are sewn or similarly assembled. This process may take up to seven to eight minutes to assemble, and requires rather skilled labor to accomplish. This may add undesirable time and cost to manufacturing the product, and may increase the likelihood of rejected goods in the event of mis-sewing.

Thus, it is an object of the present invention to provide a side bracket for netting which will advantageously provide manufacturing cost and time savings. It is a further object of the present invention to provide such a side bracket for netting which will decrease the likelihood of laborer error, thereby advantageously increasing net/bracket yield. Still further, it is an object of the present invention to provide such a side bracket for netting which can accommodate either a single or double panel net, thereby advantageously utilizing a single set of tooling for one or more netting products. Yet still further, it is an object of the present invention to provide such a side bracket which may be formed from expandable tooling, thereby advantageously utilizing a single set of tooling for variously sized netting products.

SUMMARY OF THE INVENTION

The present invention addresses and solves the above-mentioned problems by providing a side bracket for netting having a top, a bottom, two opposed sides, a plurality of net loops extending along the netting top, bottom and sides, and an elastic cord threaded through at least one of the top and bottom net loops. The bracket comprises a base having two opposed ends and located adjacent at least one of the netting sides. A net loop receiving member is disposed between the two ends. A housing is provided for the elastic cord. The bracket further comprises means for attaching the cord housing to the base, and means for attaching the netting to a desired surface.

A process for assembling the netting to the bracket comprises the step of placing a row of side net loops over a corresponding number of net loop receiving members. The net loop receiving members are disposed on a base of the bracket, and each of the net loop receiving members has an outwardly projecting net loop retaining wall having an upper surface, a lower surface, and two opposed ends adjacent the retaining wall lower surface. A loop recess is defined at each of the retaining wall ends, and means are provided for guiding opposed ends of the net loop into an adjacent loop recess. An elastic cord is threaded through at least one of the top and bottom net loops, and, on at least one side, the cord is attached to a cord housing.

BRIEF DESCRIPTION OF THE DRAWINGS

Other objects, features and advantages of the present invention will become apparent by reference to the following detailed description and to the drawings, in which:

FIG. 1 is a perspective view of the side bracket of the present invention shown with the netting attached thereto and partially cut away;

FIG. 2 is an enlarged, cut away front view of the base, showing netting in phantom on some of the net loop receiving members;

FIG. 3A is an enlarged cross sectional view taken on line 3A—3A of FIG. 2;

FIG. 3B is an enlarged cross sectional view taken on line 3B—3B of FIG. 2;

FIG. 3C is an enlarged cross sectional view taken on line 3C—3C of FIG. 2;

FIG. 4 is an enlarged perspective exploded view partially cut away showing the cord housing attached to the base with the optional base cover thereon;

FIG. 5 is a cross sectional view of the base cover only, taken on line 5—5 of FIG. 4;

FIG. 6A is a semi-schematic view of a first step in the inventive process for assembling netting to the bracket, showing elastic cord being threaded through a front panel and a back panel of the netting top loops;

FIG. 6B is a cross sectional cut away view showing a further step in the process wherein elastic cord loops are formed in two cold housings, one located on each side of the netting;

FIG. 6C is a semi-schematic view showing a further step in the process wherein netting is slipped over net loop receiving members;

FIG. 6D is a semi-schematic cut away view showing a further step in the process wherein the base cover is attached to the base after the netting has been hung on the base;

FIG. 7 is a view alternate to that of FIG. 6B, wherein only a single elastic cord extends between the two cord housings to accommodate a single panel net;

DETAILED DESCRIPTION OF THE PREFERRED EMBODIMENTS

Figure 10:
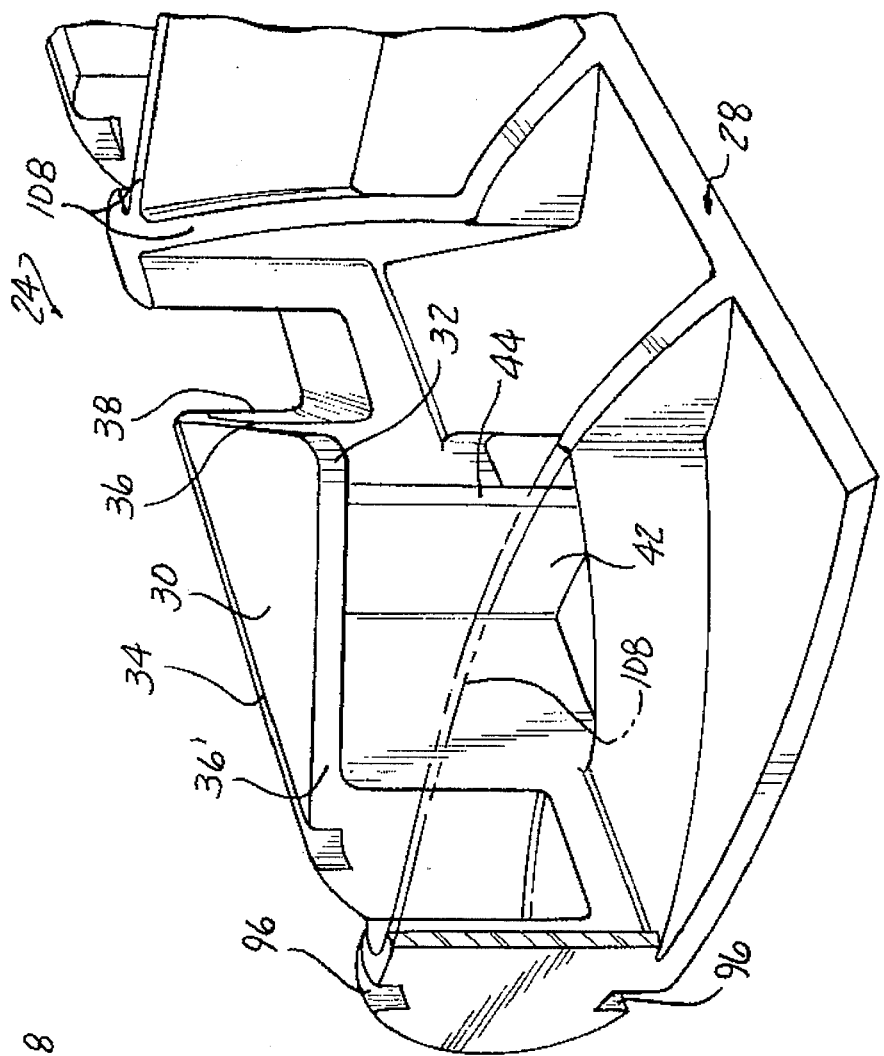
FIG. 10 is an enlarged, perspective, cutaway cross sectional view of the base with a foremost cover guiding wall shown in phantom.

Referring now to FIG. 1, the side bracket for netting as disclosed in the present invention is designated generally as 10. The netting 12 has a top 14, a bottom 16 and two sides 18. A plurality of net loops 22 extend along the netting top 14, bottom 16 and sides 18. An elastic cord 20, such as, for example, a "bungee" type cord is threaded through at least one of the top-extending and bottom-extending net loops 22. In FIG. 1, the cord 20 is shown threaded through the net loops 22 extending along the netting top 14.

Referring now to FIG. 2 as well as to FIG. 1, the side bracket 10 comprises a base 24 having two opposed ends 26, 26', the base 24 being located adjacent at least one of the netting sides 18.

Referring now to FIGS. 2 and 3A–3C, a net loop receiving member 28 is disposed between the two base ends 26, 26'. It is to be understood that the net loop receiving member 28 may comprise any suitable shape or form in accord with the present invention. However, in the preferred embodiment, net loop receiving member 28 comprises an outwardly projecting net loop retaining wall 30 having an upper surface 32, a lower surface 34, and two opposed ends 36, 36' adjacent the retaining wall lower surface 34. A loop recess 38 is defined at each of the retaining wall ends 36, 36'. The net loop receiving member 28 further comprises means for guiding opposed ends 40, 40' of the net loop 22 into an adjacent loop recess 38.

It is to be understood that this guiding means may comprise any suitable means in accord with the present invention. However, in the preferred embodiment, this means comprises a guiding wall 42 attached and substantially perpendicular to retaining wall 30, the guiding wall 42 having an upper, loop contacting surface 44 disposed below the retaining wall upper surface 32.

It is to be understood that the base 24 may be any suitable length as desired and may have any desired number of net loop receiving members 28 thereon. The base 24 of the present invention may be made using expandable tooling in order to accomplish this. Thus, the side brackets 10 may be formed to accommodate any size netting 12 as desired for a particular application.

Side bracket 10 further comprises a housing 46 for elastic cord 20, as best seen in FIG. 4. It is to be understood that this housing 46 may be of any suitable form and shape in accord with the present invention. In the preferred embodiment, this housing 46 has a first end 52 adjacent one of the netting sides 18 and a second end 54 adjacent cord loop 48. The housing 46 further comprises means for forming elastic cord 20 into a loop 48, and means for attaching the cord 20 to cord housing 46. It is to be further understood that these means may comprise any suitable means, however, in the preferred embodiment, the cord loop forming means comprises two opposed, longitudinal, cord receiving throughbores 50, at least one of which extends from the housing first end 52 to the housing second end 54. This means is best seen in FIGS. 4, 6B and 7. In FIG. 6B, on the right hand side (as depicted) of netting 12, the cord 20 is shown looping through two throughbores 50, both of which extend from housing first end 52 to housing second end 54. On the left hand side of the netting, as depicted in the Figure, only one of throughbores 50 extends from first end 52 to second end 54. The cord 20 may be threaded into throughbores 50, or the cord 20 may be injection molded into throughbores 50. Further, it is to be understood that any suitable means of looping cord 20 through throughbores 50 may be utilized.

As seen on the left hand side of FIG. 6B, the upper throughbore 50 extends through the housing first end 52 to the housing second end 54, and the lower throughbore 50 extends from the housing second end 54 partially through housing 46. The cord loop forming means further comprises a third throughbore 56, coaxial with the lower throughbore 50, and extending from the housing first end 52 partially through housing 46 in a longitudinal direction toward the lower throughbore 50. Lower throughbore 50 receives a first end 58 of elastic cord 20, and third throughbore 56 receives a second end 60 of elastic cord 20.

If a center handle 106 is used, as seen in FIG. 1, in this embodiment, the cord loop forming means may comprise two opposed, longitudinal, cord receiving throughbores 50, both of which extend from housing first end 52 to housing second end 54. This means is best seen in FIG. 1 on both the right hand side and left hand side (as depicted) of netting 12. In this embodiment, both ends of the cord 20 would terminate within handle 106 in a fourth 110 and fifth 112 cord receiving throughbore.

As seen in FIG. 7, which depicts elastic cord 20 adapted to support a single netting panel 12; cord housing 46 on both sides of netting 12 has an upper throughbore 50 extending through housing 46, and a lower throughbore 50 extending only partially into housing 46.

The cord attaching means, in the preferred embodiment, comprises an aperture 62 defined in housing 46, extending from outside housing 46 to the throughbores 50. A fastener 64 is receivable through aperture 62 and into the elastic cord 20 in throughbores 50. It is to be understood that there may be any suitable number of apertures 62, each of which may receive a fastener 64 if necessary. It is to be understood that fastener 64 may comprise any suitable means, such as rivets, staples and the like. In the preferred embodiment, fastener 64 is a staple.

Figure 8:
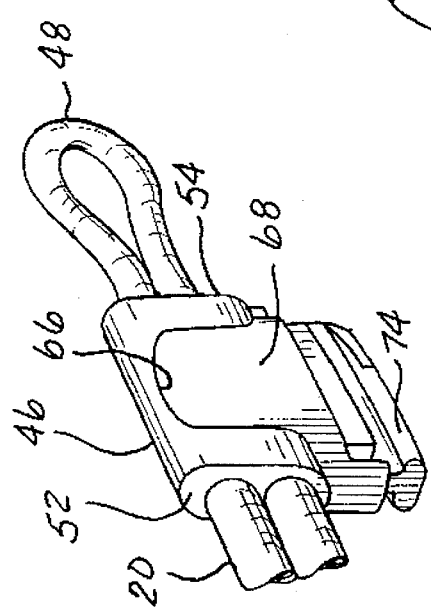
FIG. 8 is an enlarged cut away perspective view showing the cord housing with the optional cord housing cap attached thereto.
Figure 9:
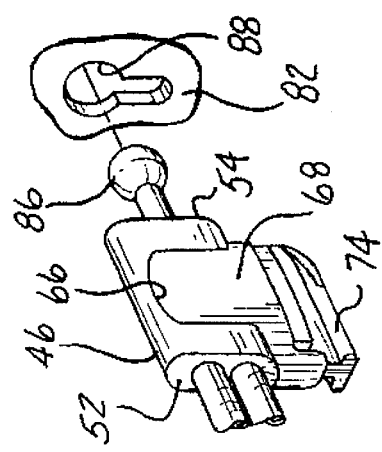
FIG. 9 is an enlarged cut away perspective view showing an alternate coupling member comprising the netting-to-surface attaching means.

Optionally, cord housing 46 may further comprise a recessed face 66 defined in cord housing 46, the face 66 containing the cord attaching means. A cord housing cap 68 may be receivable within recessed face 66, for covering the cord attaching means, as best seen in FIGS. 8 and 9. It is to be understood that cap 68 may be either permanently or removably attachable to housing 46, as desired. Cap 68 provides an aesthetically pleasing appearance, as well as affording a degree of protection against the fastener 64 inadvertently falling out of aperture 62.

The side bracket 10 further comprises means for attaching cord housing 46 to base 24. It is to be understood that this means may comprise any suitable means in accord with the present invention. However, in the preferred embodiment, the housing-to-base attaching means comprises two matingly engageable coupling members, one coupling member 70 disposed on at least one base end 26. The other member 72 is disposed on the cord housing 46, angularly offset by angle θ from elastic cord 20 extending out of cord housing 46, as best seen in FIG. 4. It is to be further understood that these coupling members 70, 72 may comprise any suitable coupling members. However, in the preferred embodiment, the coupling members 70, 72 comprise a male projection 74 extending outwardly form cord housing 46, and having a longitudinal surface parallel with throughbores 50. A female portion 76 is defined in at least one of base ends 26, 26' and complementarily shaped to male projection 74, as best seen in FIGS. 2 and 4.

It is to be understood that the side brackets 10 may be disposed on either or both sides of netting 12, and further, depending upon the desired orientation for a particular application, the "side" brackets may actually be on the "top and bottom". Further, if elastic cord 20 is strung through net loops 22 at bottom 16, in addition to being strung through net loops 22 at top 14, then one or two additional cord housings 46 may be used, on one or both sides 18 of netting 12, and these would be attached at end 26' of base 24.

The side bracket 10 further comprises means for attaching the netting 12 to a desired surface. This desired surface may be various places in an automobile such as a trunk wherein the net could be a two paneled storage net having a front netting panel 102 and a rear netting panel 104, as best seen in FIG. 1, for storing cargo therebetween. Further, it could be a one panel net, as would be accommodated by the cord 20 as shown in FIG. 7, defined against a wall of the trunk for restraining cargo between the net 12 and the trunk surface. Still further, it could be a barrier net at an automobile trunk forward end and suspended between the automobile passenger compartment and the automobile trunk compartment, such as that disclosed in U.S. Pat. Nos. 5,026,231; 5,090,856; and 5,186,587. Further, it can be a storage/convenience net for use on the backs of automobile front seats, or the inside surfaces of car doors, and the like. This can be accomplished by putting three complete netting pieces 10, 12 together, each of which accommodates a single panel net, with the forwardmost panel and side brackets having a 90° elbow attachment connecting one side bracket to an adjacent side bracket and the two side panels having the netting-to-desired surface attaching means on the side bracket adjacent the car seat or car door. The netting may further be used in any spot where storage/convenience netting may be used such as, for example, closets and the like.

The netting-to-surface attaching means may comprise any suitable means in accordance with the present invention. However, in the preferred embodiment, this means comprises two matingly engageable coupling members, one coupling member 78 disposed on the cord housing 46, and the other coupling member 80 disposed on the desired surface 82. It is to be understood that these coupling members 78, 80 may be any suitable shape or form, however, in the preferred embodiment, coupling member 78 is a loop 48 formed in the elastic cord 20 and extending outwardly from cord housing 46, and coupling member 80 comprises a loop receiving hook 84 defined on desired surface 82.

An alternate preferred embodiment for the coupling members 78, 80 is shown in FIG. 9. As shown on that Figure, coupling member 78 comprises a male projection 86 and coupling member 80 comprises a complementarily shaped female portion 88 for receiving the male projection 86. It is to be understood that projection 86 and portion 88 may comprise any suitable form or shape, and the key-like shape 86 and key hole-like portion 88 are preferred examples of the same.

It is to be understood that the housing-to-base attaching means, as well as the netting-to-desired surface attaching means may either be permanently attached to the base and desired surface, respectively, or they may be removably attachable, as desired for a particular application.

The base 24 may be formed by any suitable process and of any suitable material. However, in the preferred embodiment, base 24 is integrally molded from a polypropylene material. It is to be understood that cord housing 46 may also be formed from any suitable process and material, however, in the preferred embodiment, cord housing 46 is also integrally molded from a polypropylene material. When necessary for a particular application, such as when used for a barrier or restraint net, it may be desirable to integrally mold the base 24 from a structural acrylonitrile butadiene styrene material, and to similarly integrally mold the cord housing 46 from a structural acrylonitrile butadiene styrene material.

The base 24 of side bracket 10 may have a netting contacting surface 90 having two opposed side surfaces 92, 94 adjacent thereto. Each of the side surfaces 92, 94 may have a longitudinal groove 96 defined therein and extending from one base end 26 to the other base end 26', the grooves 96 being in proximity to the netting contacting surface 90, as best seen in FIGS. 2, 3A–3C and 4.

The side bracket 10 may further optionally comprise a cover 98 for enclosing base 24, cover 98 being complementarily shaped to base 24 and having a length substantially equal to the distance between the two base ends 26, 26'. As best seen in FIG. 5, cover 98 further may have two opposed, inwardly facing projections 100 extending the cover length, the projections 100 receivable within the base side surface grooves 96, for a snap fit attachment of cover 98 to base 24. It is to be understood that cover 98 may be attached in any suitable manner however, in the preferred embodiment, the snap fit attachment described above is preferred. An alternate preferred attaching means is to have cover 98 sonically welded to base 24. Cover 98 may be formed by any suitable process and from any suitable material. However, in the preferred embodiment, cover 98 is extruded from a polypropylene material, or if desired as discussed above, it may be extruded from an acrylonitrile butadiene styrene material.

As best seen in FIG. 10, the base 24 may further comprise a cover guiding wall 108. This wall 108 eases assembly of cover 98 to base 24, in that it may prevent cover 98 from catching on netting or interior surfaces of base 24. The cover 98 would simply glide over guiding walls 108 until, for example, projections 100 are receivable within the base side surface grooves 96.

A process for assembling netting 12 to a bracket 10 according to the present invention comprises the steps of:

threading an elastic cord 20 through at least one of the top 14 and bottom 16 net loops 22, as seen in FIG. 6A;

forming cord loops 48 at opposed ends of elastic cord 20, as seen in FIG. 6B;

attaching elastic cord 20 to a cord housing 46;

attaching cord housing 46 to a base 24 of the bracket 10, base 24 having net loop receiving members 28 disposed thereon, corresponding in number to the side netting loops 22, each of the net loop receiving members 28 having an outwardly projecting net loop retaining wall 30 having an upper surface 32, a lower surface 34, and two opposed ends 36, 36' adjacent the retaining wall lower surface 34, a loop recess 38 defined at each of the retaining wall ends 36, 36', and means for guiding opposed ends 40, 40' of the net loop 22 into an adjacent loop recess 38, as seen in FIG. 6D; and placing a row of side net loops 22 over the corresponding number of net loop receiving members 28, as seen in FIG. 6C.

The process may further comprise the step of snap fitting a cover 98 over base 24 after the side net loops 22 are placed over the net loop receiving members 28, as seen in FIG. 6D. The process may still further comprise the step of placing a cord housing cap 68 within recessed face 66, for covering the cord attaching means.

Some of the advantages of the present process may be seen in that it requires relatively unskilled labor in order to assemble netting to the bracket 10 of the present invention. In addition, due to the simplicity of the process, manufacturing time may be reduced from anywhere between seven and eight minutes to fewer than three minutes per net. Further, due to the ease in placing the net loops 22 over the net loop receiving members 28, there is little likelihood of operator error, thereby reducing the chances of rejected netting product.

While preferred embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A side bracket for netting having a top, a bottom, two opposed sides, a plurality of net loops extending along the netting top, bottom and sides, and an elastic cord threaded through at least one of the top and bottom net loops and having opposed end portions extending from the netting sides, the bracket comprising:

a base having two opposed ends and adapted to be located adjacent at least one of the netting sides, wherein the base is integrally molded from a polypropylene material;

a net loop receiving member disposed between the two ends;

a housing for holding one of the portions of the elastic cord, the cord housing being integrally molded from a polypropylene material;

means for attaching the cord housing to one of the ends of the base; and means for attaching one of the end portions of the elastic cord to a desired surface.

2. The side bracket as defined in claim 1 wherein the net loop receiving member comprises:

an outwardly projecting net loop retaining wall having an upper surface, a lower surface, and two opposed ends adjacent the retaining wall lower surface;

a loop recess defined at each of the retaining wall ends; and means for guiding opposed ends of the net loop into an adjacent loop recess.

3. The side bracket as defined in claim 1 wherein there are a plurality of net loop receiving members disposed between the two ends of the base.

4. The side bracket as defined in claim 1 wherein the cord housing comprises:

means for forming the elastic cord into a loop; and means for attaching the cord to the cord housing.

5. The side bracket as defined in claim 4 wherein the cord housing has a first end adjacent one of the netting sides and a second end adjacent the cord loop, and wherein the cord loop forming means comprises two opposed, longitudinal, cord receiving throughbores, at least one of which extends from the housing first end to the housing second end.

6. The side bracket as defined in claim 5 wherein the cord is threaded into the throughbores.

7. The side bracket as defined in claim 5 wherein the cord is injection molded into the throughbores.

8. The side bracket as defined in claim 5 wherein both throughbores extend from the housing first end to the housing second end.

9. The side bracket as defined in claim 1 wherein the housing-to-base attaching means comprises two matingly engagable coupling members, one of the two members disposed on at least one base end, and the other of the two members disposed on the cord housing, angularly offset from the elastic cord extending out of the cord housing.

10. The side bracket as defined in claim 1 wherein the netting-to-surface attaching means comprises two matingly engageable coupling members, one member disposed on the cord housing, and the other member disposed on the desired surface.

11. The side bracket as defined in claim 10 wherein the netting-to-surface coupling members comprise:

a loop formed in the elastic cord and extending outwardly from the cord housing; and a loop receiving hook defined on the desired surface.

12. The side bracket as defined in claim 10 wherein the netting-to-surface coupling members comprise:

a male projection; and a complementarily shaped female portion for receiving the male projection.

13. The side bracket as defined in claim 1 wherein each of the netting-to-surface attaching means and housing-to-base attaching means are removably attachable.

14. The side bracket as defined in claim 1 wherein the netting defines a storage net.

15. The side bracket as defined in claim 1 wherein the netting defines a barrier net at an automobile trunk forward end and suspended between the automobile passenger compartment and the automobile trunk compartment.

16. A side bracket for netting having a top, a bottom, two opposed sides, a plurality of net loops extending along the netting top, bottom and sides, and an elastic cord threaded through at least one of the top and bottom net loops and having opposed end portions extending from the netting sides, the bracket comprising:

a base having two opposed ends and adapted to be located adjacent at least one of the netting sides;

a net loop receiving member disposed between the two ends, wherein the net loop receiving member comprises:

an outwardly projecting net loop retaining wall having an upper surface, a lower surface, and two opposed ends adjacent the retaining wall lower surface;

a loop recess defined at each of the retaining wall ends; and means for guiding opposed ends of the net loop into an adjacent loop recess, wherein the guiding means comprises a guiding wall attached and substantially perpendicular to the retaining wall, the guiding wall having an upper, loop contacting surface disposed below the retaining wall upper surface;

a housing for holding one of the portions of the elastic cord;

means for attaching the cord housing to one of the ends of the base; and means for attaching one of the end portions of the elastic cord to a desired surface.

17. The side bracket as defined in claim 16 wherein there are a plurality of net loop receiving members disposed between the two ends of the base.

18. A side bracket for netting having a top, a bottom, two opposed sides, a plurality of net loops extending along the netting top, bottom and sides, and an elastic cord threaded through at least one of the top and bottom net loops and having opposed end portions extending from the netting sides, the bracket comprising:

a base having two opposed ends and adapted to be located adjacent at least one of the netting sides;

a net loop receiving member disposed between the two ends;

a housing for holding one of the portions of the elastic cord, wherein the cord housing comprises:
  means for forming the elastic cord into a loop; and
  means for attaching the cord to the cord housing;
  wherein the cord housing has a first end adapted to be adjacent one of the netting sides and a second end adapted to be adjacent the cord loop, and wherein the cord loop forming means comprises two opposed, longitudinal, cord receiving throughbores, wherein one of the two opposed throughbores extends from the housing first end to the housing second end, the other of the two opposed throughbores extends from the housing second end partially through the housing, and wherein the cord loop forming means further comprises a third throughbore, coaxial with the other of the two opposed throughbores, and extending from the housing first end partially through the housing in a longitudinal direction toward the other of the two opposed throughbores, the other of the two opposed throughbores for receiving an end of the elastic cord, and the third throughbore for receiving a second end of the elastic cord;

means for attaching the cord housing to one of the ends of the base; and means for attaching one of the end portions of the elastic cord to a desired surface.

19. A side bracket for netting having a top, a bottom, two opposed sides, a plurality of net loops extending along the netting top, bottom and sides, and an elastic cord threaded through at least one of the top and bottom net loops and having opposed end portions extending from the netting sides, the bracket comprising:

a base having two opposed ends and adapted to be located adjacent at least one of the netting sides;

a net loop receiving member disposed between the two ends;

a housing for holding one of the portions of the elastic cord, wherein the cord housing comprises:
  means for forming the elastic cord into a loop; and
  means for attaching the cord to the cord housing;
  wherein the cord housing has a first end adapted to be adjacent one of the netting sides and a second end adapted to be adjacent the cord loop, and wherein the cord loop forming means comprises two opposed, longitudinal, cord receiving throughbores, at least one of which extends from the housing first end to the housing second end, and wherein the cord attaching means comprises:
    an aperture defined in the housing, extending from outside the housing to the throughbores; and
    a fastener, receivable through the aperture and into the elastic cord in the throughbores;

means for attaching the cord housing to one of the ends of the base; and means for attaching one of the end portions of the elastic cord to a desired surface.

20. The side bracket as defined in claim 19 wherein the fastener is a staple.

21. A side bracket for netting having a top, a bottom, two opposed sides, a plurality of net loops extending along the netting top, bottom and sides, and an elastic cord threaded through at least one of the top and bottom net loops and having opposed end portions extending from the netting sides, the bracket comprising:

a base having two opposed ends and adapted to be located adjacent at least one of the netting sides;

a net loop receiving member disposed between the two ends;

a housing for holding one of the portions of the elastic cord;

means for attaching the cord housing to one of the ends of the base, wherein the housing-to-base attaching means comprises two matingly engagable coupling members, one of the two members disposed on at least one base end, and the other of the two members disposed on the cord housing, angularly offset from the elastic cord extending out of the cord housing, and wherein the coupling members comprise:
  a male projection extending outwardly from the cord housing, and parallel with the two opposed, longitudinal, cord receiving throughbores defined in the housing; and
  a female portion defined in at least one base end and complementarily shaped to the male projection; and means for attaching one of the end portions of the elastic cord to a desired surface.

22. A side bracket for netting having a top, a bottom, two opposed sides, a plurality of net loops extending along the netting top, bottom and sides, and an elastic cord threaded through at least one of the top and bottom net loops and having opposed end portions extending from the netting sides, the bracket comprising:

a base having two opposed ends and adapted to be located adjacent at least one of the netting sides, wherein the base has a netting contacting surface having two opposed side surfaces adjacent thereto, and wherein the side surfaces each have a longitudinal groove defined therein and extending from one base end to the other base end, the grooves being in proximity to the netting contacting surface;

a net loop receiving member disposed between the two ends;

a housing for holding one of the portions of the elastic cord;

means for attaching the cord housing to one of the ends of the base;

means for attaching one of the end portions of the elastic cord to a desired surface; and a cover for enclosing the base, the cover being complementarily shaped to the base and having a length substantially equal to the distance between the two base ends and further having two opposed, inwardly facing projections extending the cover length, the projections receivable within the base side surface grooves, for a snap fit attachment of the cover to the base.

23. The side bracket as defined in claim 22 wherein the cover is sonically welded to the base.

24. The side bracket as defined in claim 22 wherein the cover is extruded from a polypropylene material.

25. A side bracket for netting having a top, a bottom, two opposed sides, a plurality of net loops extending along the netting top, bottom and sides, and an elastic cord threaded through at least one of the top and bottom net loops, the bracket comprising:

a base having two opposed ends and adapted to be located adjacent at least one of the netting sides;

a plurality of net loop receiving members disposed between the two ends, wherein each of the net loop receiving members comprises:

an outwardly projecting net loop retaining wall having an upper surface, a lower surface, and two opposed ends adjacent the retaining wall lower surface;

a loop recess defined at each of the retaining wall ends; and means for guiding opposed ends of the net loop into an adjacent loop recess, wherein the guiding means comprises a guiding wall attached and substantially perpendicular to the retaining wall, the guiding wall having an upper, loop contacting surface disposed below the retaining wall upper surface;

a housing for the elastic cord, wherein the cord housing comprises:

means for forming the elastic cord into a loop, wherein the cord housing has a first end adjacent one of the netting sides and a second end adjacent the cord loop, and wherein the cord loop forming means comprises two opposed, longitudinal, cord receiving throughbores, at least one of which extends from the housing first end to the housing second end, and further wherein the cord is threaded into the throughbores; and means for attaching the cord to the cord housing, wherein the cord attaching means comprises:

an aperture defined in the housing, extending from outside the housing to the throughbores; and a fastening staple, receivable through the aperture and into the elastic cord in the throughbores;

means for attaching the cord housing to the base, wherein the housing-to-base attaching means comprises two matingly engageable coupling members, one member disposed on at least one base end, and the other member disposed on the cord housing, angularly offset from elastic cord extending out of the cord housing; and means for attaching the netting to a desired surface, wherein the netting-to-surface attaching means comprises:

a loop formed in the elastic cord and extending outwardly from the cord housing; and a loop receiving hook defined on the desired surface.

26. The side bracket as defined in claim 25 wherein the base has a netting contacting surface having two opposed side surfaces adjacent thereto, and wherein the side surfaces each have a longitudinal groove defined therein and extending from one base end to the other base end, the grooves being in proximity to the netting contacting surface, and wherein the side bracket further comprises:

a cover for enclosing the base, the cover being complementarily shaped to the base and having a length substantially equal to the distance between the two base ends and further having two opposed, inwardly facing projections extending the cover length, the projections receivable within the base side surface grooves, for a snap fit attachment of the cover to the base.

27. A side bracket for netting having a top, a bottom, two opposed sides, a plurality of net loops extending along the netting top, bottom and sides, and an elastic cord threaded through at least one of the top and bottom net loops and having opposed end portions extending from the netting sides, the bracket comprising:

a base having two opposed ends and adapted to be located adjacent at least one of the netting sides, wherein the base is integrally molded from a structural acrylonitrile butadiene styrene material;

a net loop receiving member disposed between the two ends;

a housing for holding one of the portions of the elastic cord, the cord housing being integrally molded from a structural acrylonitrile butadiene styrene material;

means for attaching the cord housing to one of the ends of the base; and means for attaching one of the end portions of the elastic cord to a desired surface;

wherein the netting defines a barrier net at an automobile trunk forward end and suspended between the automobile passenger compartment and the automobile trunk compartment.

28. A net comprising:

a net top;

a net bottom;

two opposed net sides;

a plurality of net loops extending along the net top, bottom and sides;

an elastic cord threaded through at least one of the top and bottom net loops and having opposed end portions extending from the net sides; and a side bracket, the bracket comprising:

a base having two opposed ends and located adjacent at least one of the netting sides, wherein the base is integrally molded from a polypropylene material;

a net loop receiving member disposed between the two ends;

a housing for holding one of the portions of the elastic cord, the cord housing being integrally molded from a polypropylene material;

means for attaching the cord housing to one of the ends of the base; and means for attaching one of the end portions of the elastic cord to a desired surface.

29. A process for assembling netting to a bracket, the netting having a top, a bottom, two opposed sides, and a row of net loops extending along each of the netting top, bottom and sides, the process comprising the step of:

placing a row of side net loops over a corresponding number of net loop receiving members, the net loop receiving members being disposed on a base of the bracket, each of the net loop receiving members having an outwardly projecting net loop retaining wall having an upper surface, a lower surface, and two opposed ends adjacent the retaining wall lower surface, a loop recess defined at each of the retaining wall ends, and means for guiding opposed ends of the net loop into an adjacent loop recess, wherein an elastic cord is threaded through at least one of the top and bottom net loops, and wherein on at least one side the cord is attached to a cord housing.

30. A process for assembling netting to a bracket, the netting having a top, a bottom, two opposed sides, and a row of net loops extending along each of the netting top, bottom and sides, the process comprising the steps of:

threading an elastic cord through at least one of the top and bottom net loops;

forming cord loops at opposed ends of the elastic cord;

attaching the elastic cord to a cord housing;

attaching the cord housing to a base of the bracket, the base having net loop receiving members disposed thereon, corresponding in number to the side netting loops, each of the net loop receiving members having an outwardly projecting net loop retaining wall having an upper surface, a lower surface, and two opposed ends adjacent the retaining wall lower surface, a loop recess defined at each of the retaining wall ends, and means for guiding opposed ends of the net loop into an adjacent loop recess; and placing a row of side net loops over the corresponding number of net loop receiving members.

31. The process as defined in claim 30, further comprising the step of snap fitting a cover over the base after the side net loops are placed over the net loop receiving members.

32. The process as defined in claim 30 wherein the cord housing has a recessed face defined therein, and the face contains the cord attaching means, the process further comprising the step of placing a cord housing cap within the recessed face, for covering the cord attaching means.

* * * * *